No. 874,844. PATENTED DEC. 24, 1907.
R. HEALY.
DETACHABLE WHEEL RIM.
APPLICATION FILED DEC. 28, 1906.

INVENTOR
Raymond Healy

UNITED STATES PATENT OFFICE.

RAYMOND HEALY, OF BROOKLYN, NEW YORK.

DETACHABLE WHEEL-RIM.

No. 874,844.　　　　Specification of Letters Patent.　　　　Patented Dec. 24, 1907.

Application filed December 28, 1906. Serial No. 349,759.

*To all whom it may concern:*

Be it known that I, RAYMOND HEALY, a citizen of the United States, and a resident of Brooklyn, in the county of Kings and State of New York, (with post-office address 90 Gold street, New York,) have invented certain new and useful Improvements in Detachable Wheel-Rims, of which the following is a specification.

My invention relates to means for detachably securing tires to vehicle wheels and more particularly to that class of devices in which a metallic rim carrying a pneumatic tire is detachably secured to the felly of the wheel by the use of side plates and clamping bolts.

The invention relates more particularly to the construction or form of the side plates and the manner of combining the same with circumferential liners interposed between the rim and felly, and the object of the invention is to provide a simple and improved construction in which the tire-carrying metallic rim shall be solidly supported by the combined side plate and liners on its inside within the whole circumferential space extending from the outer edge of one side plate to the outer edge of the opposite side plate as hereinafter more particularly set forth.

The invention consists in the novel combination of side plates, liners and rims more particularly hereinafter set forth and then specified in the claims.

Figure 1:
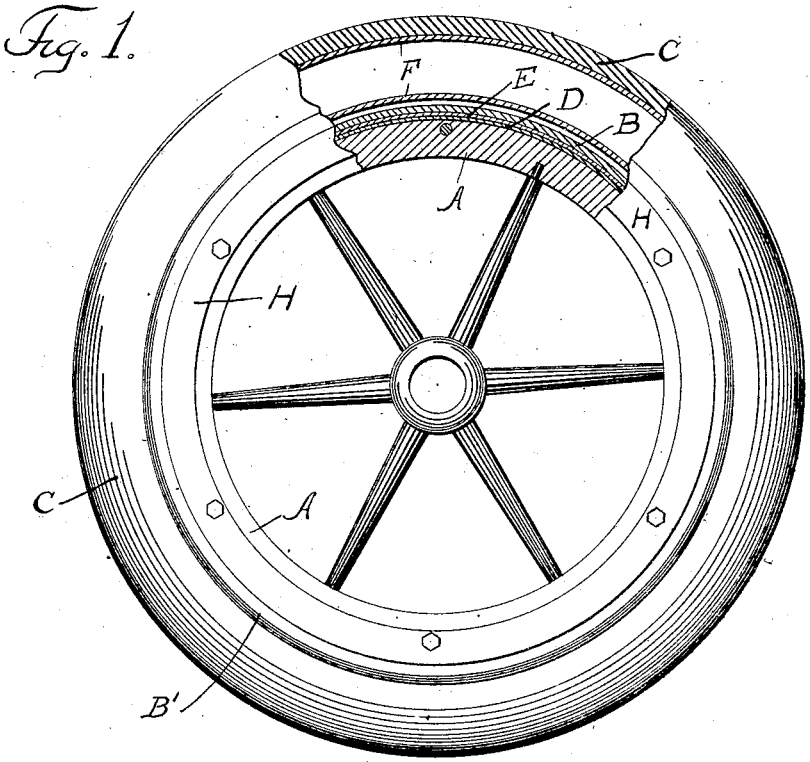
Figure 2:
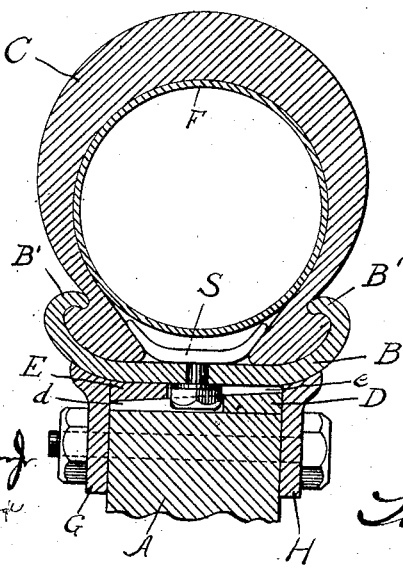

In the accompanying drawings, Figure 1 represents a wheel in side elevation and partial section having my invention attached thereto. Fig. 2 is an enlarged transverse vertical section of the same.

Referring to the drawings, A indicates the felly of the wheel and B indicates a rim of the standard type, having the usual upturned flanges or grips B' which grip the tire cover C and hold the same, the inner tube or tire proper being indicated at F.

G, H indicate annular side plates bolted or otherwise suitably fastened to the felly A. These side plates are alike in form and each has an expanded or enlarged outer edge expanded transversely away from the inner face of the plate and of such shape on its bearing surface as to conform to the bearing surface of the rim B while at the same time permitting said plates to be drawn together by the action of the clamping bolt. It will be further seen that the inclination of the bearing face and of the bearing surface of the rim is such that the plates will tend to expand the rim when they are drawn together. The inner side of each bearing edge of the side plate is moreover flush with the inner vertical face of the said plate, or, in other words, the inner face of each plate from the point of contact of said face with the felly to the point of contact of the rim with the edge of the plate forms a flat face adapted to engage with the circumferential liners D, E interposed between the rim B and the felly A. These liners are of any suitable metal and have inclined or wedge-shaped surfaces and, as will be seen, completely fill the space between the outer circumference of the felly and the inside of the rim and extend, moreover, clear across the space from the outer edge of one vertical face on the inside of a side plate to the inner face of the opposite side plate so that there will be practically a continuous supporting surface for the metal rim B extending from the outer edge of one side plate across beneath the space between them to the outer edge of the opposite plate, the whole forming a solid expansible support for the rim which, by the operation of the bolts, will take up any slack or play and thereby afford a solid and firm connection of the rim to the felly.

Transverse slots $d, e$ may be provided at intervals in the liners D, E to allow for the insertion of the heads of the usual spreaders S.

In the operation of the device, when it is desired to substitute a new tire for the old one, it is simply necessary to remove the nuts of the bolts which fasten the annular plates G, H to the felly and on removal of one plate the rim will readily leave the wheel owing to the inclination of the bearing surfaces of the liners, which inclination is such that the upper liner has its thickest edge adjacent to the removable retaining plate. The liners also facilitate the placing of a new rim as they are drawn in place and press against the rim and felly when the retaining plate is drawn up by the action of the bolts which draw movement is permitted owing to the conformation of the edge of the plate itself. As will be seen, the plates G, H are duplicates of one another and are of simple form. Moreover, their abutting or clamping faces, which engage the circumferential liners, are straight and flush with the inside of the supporting edge on which the rim rests, hus permitting the whole space inclosed by the felly, the plates and the inside face of the rim to be filled in solid by circumferential liners of the simplest form.

What I claim as my invention is:

1. The combination of a tire-carrying rim, a felly, a pair of side plates having inclined bearing edges for the rim expanded outwardly and having their inside faces between the felly and rim flush as described, and a pair of circumferential liners superposed in the space between the felly and inside of the rim, all as described to form an expansible solid bearing for the rim extending continuously from the outside of the edge of one plate to the outside edge of the opposite plate, as and for the purpose described.

2. The combination of a metal tire-carrying rim, a felly, side plates having expanded edges adapted to form a bearing or support for the rim, the inside of which bearing is flush with the vertical face of the side plate outside the felly, a pair of circumferential liners superposed upon one another and filling the space between the felly and rim and between the vertical faces of the side plates and clamping bolts adapted to draw said side plates together and expand the liners by engagement of said vertical faces with the larger edges of the liners, all as described so as to form the expansible solid bearing for the rim extending continuously from the outer edge of one side plate across the space between the bearing faces to the outer edge of the opposite side plate.

3. The combination substantially as described of a tire-carrying metallic rim, a wheel felly, a pair of side plates each affording a bearing at its edge for the rim and having a flat inner face extending from the edge of the felly to the edge of the bearing surface for the rim, a pair of circumferential liners filling the space bounded by the side plates, rim and felly, and means for drawing the side plates together, as and for the purpose described.

Signed at New York in the county of New York and State of New York this 16th day of November A. D. 1906.

RAYMOND HEALY.

Witnesses:
C. T. TISCHNER, Jr.,
LILLIAN BLOND.